US008303747B2

(12) United States Patent
Föge

(10) Patent No.: US 8,303,747 B2
(45) Date of Patent: Nov. 6, 2012

(54) WET FRICTION LINING

(75) Inventor: Volker Föge, Ebensee (AT)

(73) Assignee: Miba Frictec GmbH, Laakirchen (AT)

(*) Notice: Subject to any disclaimer, the term of this patent is extended or adjusted under 35 U.S.C. 154(b) by 543 days.

(21) Appl. No.: 11/986,052

(22) Filed: Nov. 20, 2007

(65) Prior Publication Data

US 2008/0226861 A1  Sep. 18, 2008

(30) Foreign Application Priority Data

Nov. 20, 2006 (AT) ................... A 1913/2006

(51) Int. Cl.
*B32B 27/04* (2006.01)
*F16D 69/00* (2006.01)

(52) U.S. Cl. ............... 156/242; 156/307.1; 156/312; 188/264 E

(58) Field of Classification Search .............. None
See application file for complete search history.

(56) References Cited

U.S. PATENT DOCUMENTS

| | | | | |
|---|---|---|---|---|
| 3,582,166 A * | 6/1971 | Reising | ........................ | 384/213 |
| 3,873,479 A * | 3/1975 | Zotov et al. | ...................... | 524/13 |
| 3,927,241 A | 12/1975 | Augustin | | |
| 4,051,163 A * | 9/1977 | Berger | ......................... | 556/419 |
| 4,349,595 A | 9/1982 | Trainor et al. | | |
| 4,356,137 A * | 10/1982 | Guzy et al. | ................... | 264/137 |
| 4,844,218 A * | 7/1989 | Genise | ........................ | 192/53.35 |
| 5,662,993 A | 9/1997 | Winckler | | |
| 5,858,511 A | 1/1999 | Lisowsky | | |
| 5,895,716 A | 4/1999 | Fiala et al. | | |
| 5,908,792 A * | 6/1999 | Sheehan et al. | ................ | 442/388 |
| 5,952,249 A | 9/1999 | Gibson et al. | | |
| 5,989,375 A | 11/1999 | Bortz | | |
| 6,277,769 B1 | 8/2001 | Dowell et al. | | |
| 2003/0100239 A1 | 5/2003 | Gaffney et al. | | |
| 2005/0025951 A1 | 2/2005 | Gruber et al. | | |
| 2007/0270069 A1 * | 11/2007 | Lee et al. | ...................... | 442/366 |

FOREIGN PATENT DOCUMENTS

| | | |
|---|---|---|
| DE | 23 40 464 | 11/1974 |
| DE | 30 23 188 | 1/1981 |
| DE | 29 44 864 | 5/1981 |
| DE | 31 17 832 | 2/1982 |
| DE | 31 17 823 | 11/1982 |
| DE | 224 641 | 7/1985 |
| DE | 103 34 881 | 3/2005 |
| EP | 0 762 009 | 3/1997 |
| EP | 1 382 879 | 1/2004 |

OTHER PUBLICATIONS

Austrian Office Action with English translation of same.

* cited by examiner

*Primary Examiner* — William Bell
(74) *Attorney, Agent, or Firm* — Collard & Roe, P.C.

(57) ABSTRACT

A method of producing a friction lining for wet operation resinates a textile fabric of staple fibers with a resin or resin mixture and then the textile fabric is cured under pressure or at an increased temperature. The resin or resin mixture is cured in at least two steps. In a first step the resin or resin mixture is pre-polymerized to produce a pre-product and final curing of the resin or resin mixture takes place in another step once the pre-product has been placed on a substrate. The pre-polymerization of the resin or resin mixture is run without pressure and staple fibers with a length selected from a range with a lower limit of 30 mm and an upper limit of 200 mm are used.

8 Claims, No Drawings

WET FRICTION LINING

Applicant claims priority of Austrian patent application No. A 1913/2006, filed 20 Nov. 2006, in accordance with 35 U.S.C. §119.

BACKGROUND OF THE INVENTION

1. Field of the Invention

The invention relates to a wet friction lining with a textile fabric, which is displaced with a resin or resin mixture, a friction component with a substrate on which a wet friction lining is disposed, and a method of producing a friction lining for wet operation, whereby a textile fabric is displaced with a resin or resin mixture and then cured under pressure and/or high temperature.

2. Prior Art

Conventional friction linings for wet operation are usually made from what are referred to as roving fabrics with long fibers, for which purpose different fabric weaves such as for example canvas binding, Atlas binding, twill binding, etc., are used. These fabrics are impregnated with resin and cured at a defined pressure and temperature during the subsequent processing step in order to obtain a specific strength. The greater the amount of resin which can be incorporated in the lining, the greater the strength of the friction lining will be. The materials currently used contain a proportion of resin which is limited to between 18% and 40%. There are various reasons for this. Firstly, the porosity of the fabric and hence the ability to absorb oil is reduced by the resin. This leads to a reduction in the cooling capacity of the friction system and impairs resistance to galling. Secondly, the pressing operation causes a resin film to form at the surface, which leads to fluctuating friction values and also drastically reduces the coefficient of friction. The resin at the surface often also leads to a higher noise level. A low proportion of resin increases the wear rate and results in a shorter service life due to disintegration.

Many types of friction linings are already known from the prior art. For example, patent specification DE 31 17 823 A describes a method of producing friction linings for friction clutches, whereby strands containing textile fibers, binding agent and lining materials are wound to form an annular disc, this disc is dried, hot-pressed and cured, after which its surfaces are smoothed by a machining process. The binding agent and lining materials are mixed with staple fibers to form a homogeneous mixture, which is then pressed to form one or more strands from which the disc is then wound directly. The length of the staple fibers is approximately 6 mm.

Patent specification DE 29 44 864 A also describes a friction lining, essentially containing a fiber material, a polymeric binding agent compound, fillers and optionally other additives, and the fiber material is made up entirely or partially of silicic acid fibers. The silicic acid fibers may have a staple length of from 1 mm to 40 mm. The fiber material may also be made up of a mixture of silicic acid fibers and carbon fibers. The silicic acid fibers may be twisted with fully aromatic polyamide fibers in a ratio by volume of 1:1 to form a composite thread. Several of these threads are assembled to form a strip, which is fed through an immersion bath containing a standard impregnating mixture. This mixture essentially contains phenolic resin, natural and synthetic sizing agent, as well as carbon black and graphite, kaolin, zinc oxide and sulfur. Having been impregnated, the strips are dried until they are no longer sticky and are then wound to form a disc-shaped preform and then pressed. Amongst other things, this friction lining is used for disc and drum brakes, as friction lining for clutches and as a disc material in multiple-disc clutches.

Patent specification DE 30 23 188 A describes a material for producing a friction element with improved abrasion resistance, comprising a mixture of approximately 5% to 60% of aramide fibers coated with 40% to 95% of a heat-curable cement incorporating a heat-cured resin and a heat-cured elastomer. The heat-curable cement may contain 20% by weight to 80% by weight of phenolic/formaldehyde resin and 80% to 20% of natural rubber. The aramide fibers may be continuous threads, staple fibers or cut fibers. This being the case, the aramide fibers may be coated with the heat-curable cement so that the fiber bundle is prized open or opened up to allow the cement dispersion to penetrate more easily, enabling all the threads to come into contact with the cement and absorb cement solids across their entire length.

Patent specification DD 224 641 A describes a method of producing friction materials containing glass fibers as a reinforcing agent and rubber as a binding agent, whereby the friction material is vulcanized in the semi-ebonite range, in other words with more than 5% by weight and less than 25% by of sulfur by reference to the rubber content of the friction material. The friction material may contain short fibers, such as staple fibers, mill fibers, short-cut fibers or similar, which are admixed with rubber in a solid, dissolved or dispersed form in mixing machines, and with the fillers and vulcanizing agent and other agents, for example.

These known friction linings are used for dry applications, for which purpose the fibers and resin are brought to a homogeneous mixture and then processed to form a strand.

OBJECTIVES AND ADVANTAGES OF THE INVENTION

The objective of this invention is to propose a friction lining for wet applications, which has a high oil-absorbing capacity.

This objective is achieved by the invention, in each case independently, on the basis of the wet friction lining outlined above in which the textile fabric is made from staple fibers, a friction component provided with the wet friction lining proposed by the invention, a method of producing a friction lining for wet operation whereby the resin or resin mixture is cured in at least two steps, and in a first step, the resin or resin mixture is pre-polymerized to form a pre-product and in another step, once the pre-product has been applied to a substrate, the resin or resin mixture is finally cured, as well as by a method of producing a friction lining for wet operation for which a fabric containing staple fibers is used as the textile fabric. Using a staple fiber fabric for the wet friction lining proposed by the invention results in a significantly higher porosity than can be obtained with wet friction linings known from the prior art. Consequently, a higher volume is made available for absorbing the oil. The higher proportion of oil in the wet friction lining enables the rate of wear to be reduced and thus increases service life, which also results in a better cooling action of the tribo-system. The two-step process of curing the resin or resin mixture enables a higher proportion of resin to be applied, thereby improving the strength of the friction lining.

In order to increase the absorption capacity of the staple fibers, the latter may be made by tearing them from long fibers, although it would also be possible to use cut staple fibers or to use fibers which are already in the form of staple fibers due to the way in which they have been produced, within the scope of the invention.

The staple fibers may have a length selected from a range with a lower limit of 30 mm and an upper limit of 200 mm. The resultant textile fabrics have a very good oil absorbing capacity.

It is also of advantage to use staple fibers with a length selected from a range with a lower limit of 60 mm and an upper limit of 140 mm, which results in a similar oil absorption capacity.

The proportion of resin or resin mixture by reference to the textile fabric/resin mixture may be selected from a range with a lower limit of 35%, in particular 40%, and an upper limit of 75%, in particular 85%, thereby imparting a very high strength to the wet friction lining.

However, improved strength can also be imparted to the wet friction lining if the proportion of resin or resin mixture by reference to the textile fabric/resin mixture is selected from a range with an upper limit of 70%, in particular a range with a lower limit of 40%, preferably 50%, and an upper limit of 60%, preferably 70%.

The resin is preferably selected from a group comprising epoxy resins, phenolic resins, melamine resins, cyanate resins and mixtures thereof. These types of resin result in a very good adhesion to the textile fabric used, thereby ensuring a correspondingly high strength of the wet friction lining.

The staple fibers are preferably selected from a group comprising carbon fibers, glass fibers, aramide fibers, polyacrylonitrile fibers, mineral fibers, such as basalt fibers, silicon carbide fibers and mixtures thereof, for example. These fibers exhibit a very good resistance to temperature, thereby enabling the service life and mechanical strength of the wet friction lining to be improved.

In another embodiment, the wet friction lining has an oil absorption capacity selected from a range with a lower limit of 0.2 ml/cm$^3$ of lining and an upper limit of 0.4 ml/cm$^3$ of lining, thereby improving the cooling capacity of the friction system as well as improving resistance to galling.

The wet friction lining may be adhered to the substrate of the friction component by adhesive. Amongst the adhesives which might be used are synthetic resins, such as epoxides, resins with a phenol base and adhesives with a rubber base such as a nitrile rubber base for example. This makes assembly simple and inexpensive.

In one particular embodiment, the adhesive is formed by the resin or resin mixture itself, which means that the wet friction lining can be applied directly to the substrate without the need for additional process steps to position the friction lining.

The friction component may be designed as a friction disc for wet clutches, differential slip or torque vectoring applications or as a synchronizer ring or dual-cone rings for transmissions. By torque vectoring applications is meant applications involving driving dynamics whereby speed differences of a limited slip differential are increased by this system. For example, the steering of a motor vehicle can be assisted by distributing the torques unequally to the wheels. As a result, a higher torque can be applied to the outer wheel on bends, thereby inducing over-steering behavior under normal driving conditions.

With the method proposed by the invention, the pre-polymerization can be effected to a polymerization degree selected from a range with a lower limit of 70% and an upper limit of 98%, in particular 95%. As a result, the pre-product already has a very high mechanical strength in readiness for further processing to produce the finished friction component, thereby simplifying handling of this pre-product. The degree of strength can be controlled on the basis of the degree of polymerization, in which case the higher the degree of polymerization, the higher the mechanical strength is.

The resin or resin mixture is preferably polymerized without pressure. This ensures that the resin is deposited on the fibers but without filling the free volume of the fabric and without the resin being forced onto the surface. This ensures that a pure resin layer does not form on the surface, thereby making use of the fibers of the fabric. This leads to improved behavior in terms of noise, vibrations and roughness. It also enables higher coefficients of friction to be obtained under different pressure and differential speed conditions.

The resin or resin mixture is preferably cured at a high temperature but below the melting point of the resin or resin mixture. This means that the resin becomes active again but does not liquefy, thereby preserving adhesion. The fabric matrix can therefore be condensed without tension and without being damaged due to the formation of tearing or splitting, for example. As a result, it is also possible to ensure that compressing the friction lining due to processing below the melting point does not produce a pure resin layer at the lining surface. During the second stage, in other words the final cross-linking, the strength of the friction lining is additionally strengthened. A significant improvement in setting behavior and wear is achieved due to the high proportion of resin and the high degree of cross-linking.

It is also possible for the staple fibers to be twisted directly to form fiber strands, in other words no yarn is formed, which means that the fabric will have a coarser structure, thereby imparting a higher volume of cavities for absorbing oil.

Adhesion to the resin or resin mixture and the oil absorption capacity can also be improved by roughening the staple fibers or long fibers prior to displacing them with the resin or resin mixture.

Finally, the staple fibers or long fibers may be displaced with a coupling agent prior to displacing them with the resin or resin mixture, thereby enabling the capacity of the resin to adhere to the fibers to be improved. Such coupling agents are silanes and resins such as primers with a phenol base, for example.

In order to provide a clearer understanding, the invention will be explained in more detail below.

DETAILED DESCRIPTION OF PREFERRED EMBODIMENTS

Firstly, it should be pointed out that individual features or combinations of features from the different examples of embodiments described below may be construed as independent solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

In the embodiment described as an example here, the wet friction lining is produced by tearing long fibers of carbon into short fibers with an average length selected from a range with a lower limit of 30 mm and an upper limit of 200 mm and then twisting them to form fiber strands. This results in a high porosity and above all a high specific surface.

A fabric is then produced from these fiber strands and, depending on the application, either canvas, twill or Atlas fabric may be used as a fabric binding. Since such bindings have long been known, further explanation of these bindings and sub-groups of these basic bindings is not necessary at this point and the skilled person may refer to the relevant background literature.

The fiber strands may also be made from different fibers, in particular those mentioned above as well as mixtures of different staple fibers. For example, it would be possible to use carbon fibers mixed with glass fibers or aramide fibers (Kevlar fibers) or silicon carbide fibers. Hybrid fabrics made from several of the above-mentioned types of fibers may also be used. Metal fibers could also be used, such as copper fibers, etc., for example. Another option is to produce the staple fibers as long fibers made up of multiple layers, for example, with a harder fiber in the core and a softer fiber as the exterior of the long fiber.

In principle, it would also be possible to use textile fibers, although this would significantly reduce resistance to wear as well resistance to temperature and it is therefore preferable to use the fibers or fiber mixtures listed above. Particularly preferred are fiber mixtures containing carbon fibers because carbon fibers have a very good resistance to temperature.

The staple fiber fabrics are then fed through a resin bath. The types of resin which may be used include the resins mentioned above in particular, such as resins produced by reacting phenol, e.g. resorcinol, with aldehydes, e.g. formaldehyde, acroleine, or melamine resins, epoxy resins, epoxided phenolic resins, melamine/formaldehyde resins or similar.

Once the staple fiber fabric has been displaced with resin, it is transferred to a drying zone and dried.

By contrast with the roving fabrics used to date, comprising long fibers, staple fiber fabrics have a significantly higher ability to absorb resin due to their high specific surface. These fabrics preferably have a specific surface which is at least 10%, preferably at least 50%, higher than that of fabrics comprising long fibers. During the process of immersing the fabric in the resin bath, a proportion of resin is absorbed by the fabric selected from a range with a lower limit of 40% and an upper limit of 90%, in particular 85%. The resin absorption can be adjusted by adjusting the dwell time of the staple fiber fabric in the resin bath itself.

This impregnated fabric is then pre-polymerized at a defined temperature to the desired degree of polymerization, for example a degree of polymerization of 95%, and thus partially cured. The temperature will depend on the resin used and may be between 150° C. and 250° C. The time may also be used to influence the degree of polymerization. The pre-polymerization may be run for a period of 2 hours to 7 hours to obtain the desired degree of polymerization.

Pre-polymerization is preferably run without pressure. By without pressure is meant that the resin/fabric compound is pre-polymerized solely by its intrinsic weight. In one embodiment, it is possible for several of these fabrics to be stacked one above the other and separated from one another by separator plates. In this instance, without pressure means that these resin-impregnated fabrics are cured solely by virtue of their own weight and the weight of the separator plates lying on top. In one special embodiment, it is possible for at least individual but preferably all layers of the resin-impregnated fabrics to be supported separately, for example at the side, so that the layers lying underneath are not affected by the weight of the layers disposed on top of them. Without any direct contact between the layers, a more uniform result can be achieved across the entire stack. Plate presses, drying ovens or similar may be used for the curing process.

The advantage of running the pre-polymerization without pressure is that the resin is deposited on the fibers but does not fill out the volume. The resin is also not pressed against the surface. Depending on the degree of polymerization, a relatively high strength is imparted to the fabric at the stage of obtaining this pre-product already.

In order to produce the friction component, in other words the components mentioned above in particular, the wet friction lining is laminated with adhesive and the appropriate shapes punched or cut from the fabric, enabling rings, segments or similar to be produced, for example. These pre-products are pre-positioned on a substrate, for example a disc for clutches or differential locks or distributor gears or synchronizer rings, etc.

In one particular embodiment, the resin or resin mixture itself is used for bonding to the substrate instead of adhesive.

During the curing and adhering process, the substrate is adhered to the pre-product in a hot press by means of a press die. The fabric is at least almost fully polymerized and thus cured at the defined temperature, e.g. between 150° C. and 180° C. depending on the resin used and on the respective degree of pre-polymerization, and under pressure for a specific time, for example selected from a period with a lower limit of 30 sec and an upper limit of 5 min, again depending on the degree of pre-polymerization. By subjecting the resin matrix to a final curing process and because of the compaction of the wet friction lining which takes place at the same time, the porosity is reduced compared with the pre-product but is still significantly higher than that of roving fabrics. This process step imparts to the fabric its ultimate strength and ultimate porosity. The porosity can therefore be set within certain limits. These values are varied depending on the application and requirements. For example, a density of 0.5 g/cm$^3$ to 1.2 g/cm$^3$, in particular 0.6 g/cm$^3$ to 0.9 g/cm$^3$, or 0.6 g/cm$^3$ to 0.7 g/cm$^3$ can be set.

The porosity of the wet friction lining based on the embodiment described as an example was determined using a so-called Gurley densometer. Gurley densometers are used for measuring the porosity of papers. Standard paper porosities are between 200 μm/Pa s and 600 μm/Pa s. The wet friction lining proposed by the invention has a porosity of between 2000 μm/Pa s and 2500 μm/Pa s in spite of the high proportion of resin.

Compressibility tests were conducted on linings produced by the method proposed by the invention and a deformation in the range of 0.18 mm to 0.21 mm was observed when a maximum force of 150 000 N was applied.

As explained above, it is also possible to take steps to obtain better adhesion of the resin to the fabric. For example, the fibers may be roughened and/or displaced with a primer.

The embodiments described as an example represents possible variants of the method and the friction lining, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The invention claimed is:

1. Method of producing a friction lining for wet operation, whereby a textile woven fabric of staple fibers is resinated with a resin or resin mixture to form a textile woven fabric/resin mixture wherein the resin or resin mixture is present in a proportion between 40 wt. % and 70 wt. % with reference to the textile woven fabric/resin mixture and then cured under pressure and/or at an increased temperature, and the resin or resin mixture is cured in at least two steps, and in a first step the resin or resin mixture is pre-polymerized at a temperature between 150° C. and 250° C. to produce a pre-product and final curing of the resin or resin mixture takes place in another step once the pre-product has been placed on a substrate, wherein the pre-polymerization of the resin or resin mixture is run without pressure and staple fibers with a length selected from a range with a lower limit of 30 mm and an upper limit of 200 mm are used, the friction lining having a porosity between 2000 μm/Pa s and 2500 μm/Pa s.

2. Method according to claim 1, wherein the pre-polymerization is run to a degree of polymerization selected from a range with a lower limit of 70% and an upper limit of 98%.

3. Method according to claim 1, wherein the final curing takes place below the melting point of the resin or resin mixture.

4. Method according to claim 1, wherein, in order to produce the textile woven fabric, long fibers are torn or cut to form staple fibers, they are then twisted to form fiber strands and the woven fabric is made from the fiber strands.

5. Method according to claim 4, wherein the long fibers are roughened prior to being resinated with the resin or resin mixture.

6. Method according to claim 4, wherein the long fibers are mixed with a coupling agent prior to being resinated with the resin or resin mixture.

7. Method according to claim 1, wherein the staple fibers are roughened prior to being resinated with the resin or resin mixture.

8. Method according to claim 1, wherein the staple fibers are mixed with a coupling agent prior to being resinated with the resin or resin mixture.

* * * * *